United States Patent
Masters

(10) Patent No.: US 10,303,482 B2
(45) Date of Patent: May 28, 2019

(54) DYNAMIC PROCESSOR FREQUENCY SELECTION

(71) Applicant: Red Hat, Inc., Raleigh, NC (US)

(72) Inventor: Jonathan Charles Masters, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 43 days.

(21) Appl. No.: 15/451,846

(22) Filed: Mar. 7, 2017

(65) Prior Publication Data
US 2018/0260229 A1  Sep. 13, 2018

(51) Int. Cl.
| G06F 9/40 | (2006.01) |
| G06F 9/42 | (2006.01) |
| G06F 1/32 | (2019.01) |
| G06F 9/38 | (2018.01) |
| G06F 1/3296 | (2019.01) |
| G06F 1/3293 | (2019.01) |
(Continued)

(52) U.S. Cl.
CPC .......... *G06F 9/3844* (2013.01); *G06F 1/3296* (2013.01); *G06F 9/3855* (2013.01); *G06F 1/3203* (2013.01); *G06F 1/324* (2013.01); *G06F 1/3293* (2013.01); *G06F 9/325* (2013.01); *G06F 9/3806* (2013.01)

(58) Field of Classification Search
CPC ...... G06F 9/3844; G06F 9/3855; G06F 9/325; G06F 9/30065; G06F 9/30058; G06F 9/3806; G06F 9/381; G06F 1/3203; G06F 1/324; G06F 1/3293; G06F 1/3296
USPC ......... 712/239–241, 248; 713/322, 323, 324, 713/330, 340
See application file for complete search history.

(56) References Cited

U.S. PATENT DOCUMENTS

| 6,845,504 B2 | 1/2005 | Hua et al. |
| 7,571,302 B1 | 8/2009 | Chen et al. |
(Continued)

OTHER PUBLICATIONS

Cui et al., Lock-contention-aware scheduler: A scalable and energy-efficient method for addressing scalability collapse on multicore systems, ACM Transactions on Architecture and Code Optimization, vol. 9, Issue 4, Jan. 2013 (4 pages) Link: http://dl.acm.org/citation.cfm?id=2400703.

(Continued)

*Primary Examiner* — Daniel H Pan
(74) *Attorney, Agent, or Firm* — K&L Gates LLP

(57) ABSTRACT

A dynamic processor frequency selection system includes a memory and a processor in communication with the memory. The processor includes a dynamic processor frequency selection module, a branch predictor module, a measurement module, and a power module. The measurement module measures a value according to a looping prediction function, which represents a quantity of cycles spent waiting for a type of contended resource within an instruction sequence. Additionally, the processor retains the value and branch history information, which is used to predict a waiting period associated with a potential loop. Then, the dynamic processor frequency selection module predicts the potential loop in a subsequent instruction according to the type of contended resource. The power module dynamically reduces a processor frequency during the waiting period from a first frequency state to a second frequency state according to the potential loop prediction. Then, the processor resumes operation at the first frequency state.

20 Claims, 5 Drawing Sheets

(51) Int. Cl.
*G06F 9/32* (2018.01)
*G06F 1/324* (2019.01)
*G06F 1/3203* (2019.01)

(56) References Cited

U.S. PATENT DOCUMENTS

| | | | |
|---|---|---|---|
| 7,730,340 B2 | 6/2010 | Hu et al. | |
| 7,987,452 B2 | 7/2011 | Kronlund et al. | |
| 8,645,963 B2 | 2/2014 | Gupta et al. | |
| 8,707,315 B2 | 4/2014 | Koning et al. | |
| 9,304,776 B2* | 4/2016 | Dice | G06F 9/30079 |
| 9,524,196 B2 | 12/2016 | Gschwind et al. | |
| 2009/0048804 A1* | 2/2009 | Gary | G06F 1/3203 |
| | | | 702/176 |
| 2015/0113304 A1* | 4/2015 | Kim | G06F 1/324 |
| | | | 713/322 |
| 2015/0355700 A1* | 12/2015 | Pusukuri | G06F 1/329 |
| | | | 713/323 |
| 2016/0019063 A1* | 1/2016 | Rappoport | G06F 9/3009 |
| | | | 712/212 |

OTHER PUBLICATIONS

Mozafari et al., Performance and Resource Modeling in Highly-Concurrent OLTP Workloads, Jun. 22-27, 2013 (12 pages) Link: https://web.eecs.umich.edu/~mozafari/papers/sigmod_2013.pdf.

Pan et al., Forecasting Lock Contention Before Adopting Another Lock Algorithm, Department of Information Technology Uppsala University, published 2015 (10 pages) Link: http://www.it.uu.se/katalog/xiapa635/thesis/main.pdf.

* cited by examiner

DYNAMIC PROCESSOR FREQUENCY SELECTION

BACKGROUND

Computer systems may run applications and processes that execute various instructions on a processor. Processors may execute instructions at various performance levels based on the processors frequency and/or the voltage supplied to the processor. Additionally, the various instructions may require resources on the computer system, which may have limited access to resources or may require locks for certain resources. For example, a lock may need to be acquired before accessing data protected by the lock to ensure mutual exclusion and that the correct data is obtained. Other locks, such as a spinlock may cause a processor thread trying to acquire the lock to wait in a loop (e.g., spin) while repeatedly checking if the lock is available. After the lock becomes available, the processor may access the resource. For example, the lock ensures a reliable transaction when accessing the data by preventing lost updates or dirty reads due to accessing the data before a lock has been released.

SUMMARY

The present disclosure provides new and innovative systems and methods for dynamic processor frequency selection. In an example, a system includes a memory and at least one processor in communication with the memory. The at least one processor includes a dynamic processor frequency selection module, a branch predictor module, a measurement module, and a power module. The processor is caused to measure, by the measurement module, a first value representing a quantity of cycles spent waiting for a type of contended resource within an instruction sequence having at least one instruction. The first value is measured according to a looping prediction function. Additionally, the processor is caused to retain the first value with branch history information. The first value, the branch history information, or a combination of the first value and branch history information is used to predict a waiting period associated with a potential loop. Then, the dynamic processor frequency selection module predicts the potential loop in a subsequent instruction according to the type of contended resource. The power module dynamically reduces a processor frequency from a first frequency state to a second frequency state according to the potential loop prediction. The power module dynamically reduces the processor frequency during the waiting period. Then, the processor is caused to resume operation at the first frequency state after the waiting period.

In an example, a method includes measuring a first value representing the number of cycles spent waiting for a type of contended resource within an instruction sequence having at least one instruction. The first value is measured according to a looping prediction function. The processor retains the first value alongside branch history information. The first value, the branch history information, or a combination of the first value and branch history information is used to predict a waiting period associated with a potential loop. The processor predicts the potential loop in a subsequent instruction according to the type of contended resource. Then, the processor dynamically reduces a processor frequency from a first frequency state to a second frequency state according to the potential loop prediction. The processor frequency is dynamically reduced during the waiting period, and the processor resumes operation at the first frequency state after the waiting period.

In an example, a non-machine readable medium readable medium storing code executes on a processor and causes the processor to measure a first value representing a quantity of cycles spent waiting for a type of contended resource within an instruction sequence having at least one instruction. The first value is measured according to a looping prediction function. The processor retains the first value with branch history information. The first value, the branch history information, or a combination of the first value and the branch history information is used to predict a waiting period associated with a potential loop. The processor predicts the potential loop in a subsequent instruction according to the type of contended resource. Additionally, the processor dynamically reduces a processor frequency from a first frequency state to a second frequency state according to the potential loop prediction. The processor frequency is dynamically reduced during the waiting period, and the processor resumes operation at the first frequency state after the waiting period.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
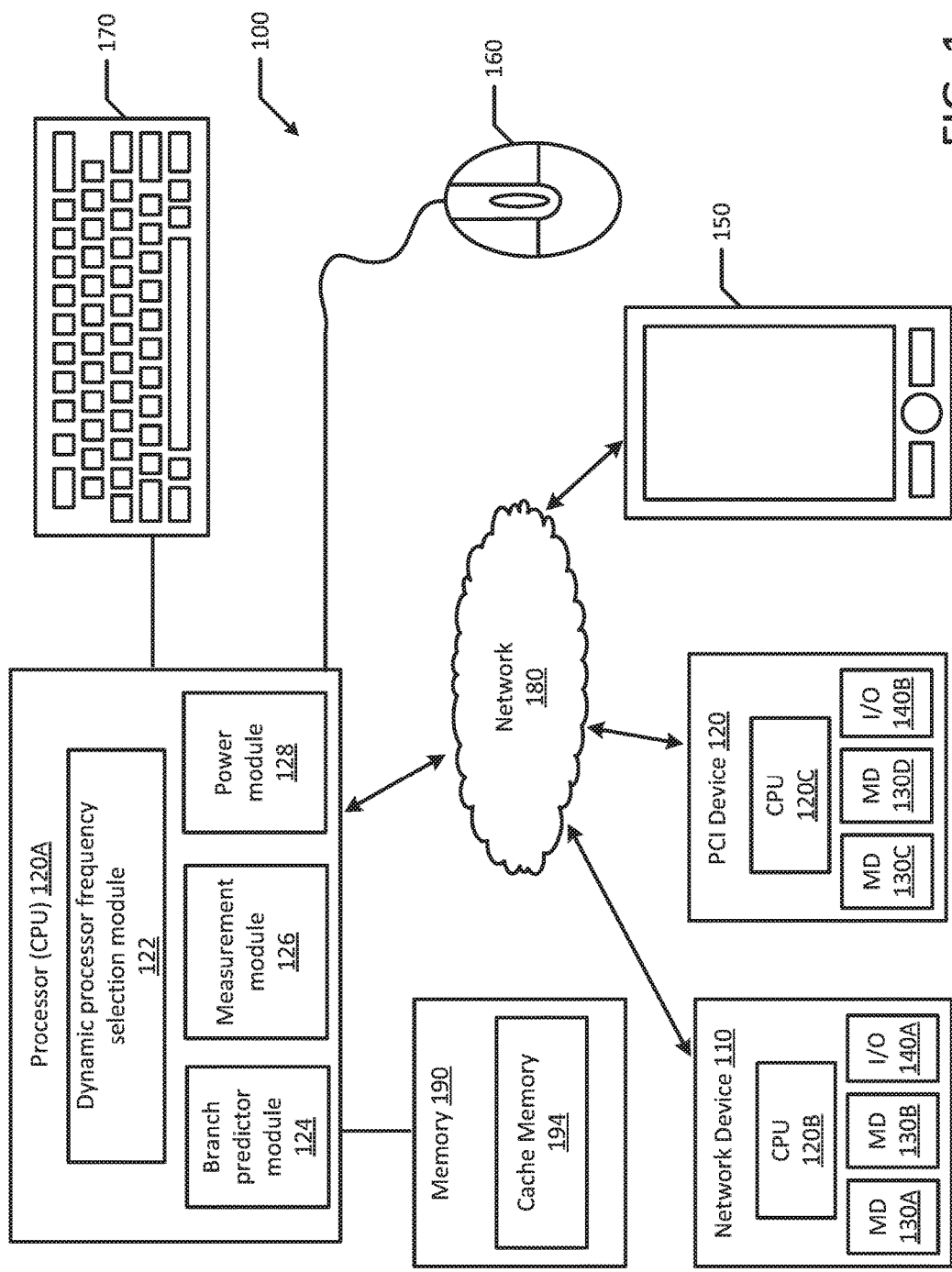
FIG. 1 illustrates a block diagram of an example computer system according to an example embodiment of the present disclosure.

Techniques are disclosed for providing dynamic processor frequency selection based upon predicted lock contention windows. Current techniques of reducing processor frequency at runtime typically involve monitoring battery capacity or system temperature and reducing processor performance (e.g., frequency and/or voltage) to increase battery life and/or reduce heat output and allow quieter operation of the system (e.g., system cooling fans may be throttled down or turned off thereby reducing noise levels). When a processor executes instructions, the processor may need to wait for a contended resource, such as a data item, a lock, or an external event. For example, a lock, such as a spinlock, may cause a processing thread trying to acquire the lock to simply wait in a loop while repeatedly checking if the lock is available. During this time, the processor remains active, but is not performing a useful task, and therefore may be wasting computer resources. Specifically, spinlocks may waste computer resources and may prevent other threads from running and may result in the processor rescheduling subsequent instructions. For example, instead of using processor time to execute a different task, the processor time is wasted on repeatedly spinning and checking for lock availability. Additionally, processor frequency selection at runtime may be achieved by, prior to runtime, modifying software and source code to enable the processor to run at a different frequency while waiting for a lock. However, in practice, processor frequency selection at runtime is typically not done as software is typically independent of the type of processor used in a computer system. For example, software may be implemented on systems with varying processor performance capabilities. By pre-modifying source code to reduce the frequency of a processor during lock waiting periods, the system may not run optimally or the modification may not work for a specific processor. For example, if the program is modified to reduce processor frequency to 2.8 GHz during a lock waiting period, the modification would not work and/or would be counterproductive on systems that utilize processors that can only operate at a maximum of 2.5 GHz. Conversely, the present disclosure enables dynamic processor frequency selection during runtime by inserting new instructions or micro-operations into the instruction stream to slow down a particular processor based on predicted waiting periods experienced by that particular processor. The waiting periods may be predicted based on processor capabilities and therefore enable dynamic processor frequency selection that is optimized for each respective system software is installed on.

As discussed in the various example embodiments disclosed herein, to improve performance and efficiency and conserve resources (e.g., battery life) for systems with varying processor capabilities, a dynamic frequency selection system may measure a value representing a quantity of cycles spent waiting for a type of contended resource, such as a table in a database, while executing an instruction sequence. The table may be protected by a lock, such as a spin lock, to ensure that the table is up to date before it is retrieved. For example, the dynamic frequency selection system may measure the quantity of cycles spent waiting for the database table according to a looping prediction function and may retain the value with branch history information (e.g., 100 ms spent waiting for the data table when processor is running at 4.2 GHz and another 50 ms spent waiting for password associated with the data table). The value and/or the branch history information may be used to predict a waiting period associated with a potential loop (e.g., looping caused during a spin lock). Then the processor may predict a waiting period associated with the potential loop. For example, the looping prediction function may measure the waiting period associated with waiting for the data table and other conditional instructions often associated with waiting for the data table. For example, the waiting period may be calculated in view of branch history information that suggests that often times a password entry is required after the data table is retrieved. Instead of the processor spinning and wasting computer resources at the processors current performance state, the processor dynamically reduces the processor frequency to a lower frequency state during runtime according to the potential loop prediction (e.g., from 4.2 GHz to 2.8 GHz) which allows the processor to optimally complete other tasks during the waiting period and conserves resources until the data table and password entry are obtained. Dynamically reducing the processor frequency advantageously conserves resources and improves the efficiency of the processor. For example, the processor dynamically reduces the processor frequency during the waiting period thereby advantageously enhancing battery life, reducing power consumption and heat output of the system, and extending the life time of computer components. As the waiting period nears an end, the processor may throttle up and resume operating at the first frequency state to ensure that the subsequent instructions are executed at the appropriate performance level thereby efficiently executing instructions while saving system resources and battery life.

Additionally, the processor may execute other out-of-order instructions during the waiting period to complete an instruction sequence in the shortest amount of time possible. For example, the processor my execute instructions in an order governed by the availability of input data or contended resources. Depending on the waiting period, the processor may execute subsequent instructions during the waiting period such that the processor can continue operating at a relatively high performance, which advantageously avoids scenarios when the processor is idle while waiting for preceding instructions to complete to retrieve data for the next instruction in an instruction sequence.

FIG. 1 depicts a high-level component diagram of an example computer system 100 in accordance with one or more aspects of the present disclosure. The computer system 100 may include a processor 120A and a memory 190. In an example, memory 190 may include cache memory 194. The processor 120A may include a dynamic processor frequency selection module 122, a branch predictor module 124, a measurement module 126, and a power module 128. In an example, the measurement module 126 may measure values representing quantities of cycles spent waiting for contended resources. Additionally, the values may be measured according to a looping prediction function. The looping prediction function may calculate waiting periods based on clock cycles and branch history information. For example, the looping prediction function may account for processor frequency, clock cycles, and subsequent processing times for future tasks that are often associated with the current waiting time. The branch predictor module 124 may predict a branch chain direction or a conditional jump within an instruction sequence based on branch history information. The dynamic processor frequency selection module 122 may predict a potential loop in a subsequent instruction according to a type of contended resource required by the subsequent instruction. For example, a subsequent instruction may include a database call for a table that was previously requested. The processor frequency selection module 122 may predict a potential loop associated with obtaining the table and waiting for a user password entry to compare against the table entry, which may normally trigger a spin lock or loop. Additionally, the power module 128 may dynamically reduce a processor frequency and/or processor voltage during runtime according to the potential loop prediction.

The processor 120A may communicate with various devices such as a network device 110, a peripheral component interconnect (PCI) device 120, an input device 150, a mouse 160, and/or a keyboard 170. Processor 120A may receive any type of input, including inputs from a touch screen. For example, keyboard 170 may be a touchscreen of a mobile device which processor 120A resides in.

In an example embodiment, the network device 110, user device 150, PCI device 120, and peripheral devices such as mouse 160 and/or keyboard 170 may communicate via a network 180. For example, the network 180 may be a public network (e.g., the Internet), a private network (e.g., a local area network (LAN) or wide area network (WAN)), or a combination thereof. In an example embodiment, network device 110 may communicate with processor 120A wirelessly via the Internet, or network device 110 may communicate with processor 120A via an ethernet connection while PCI device 120 communicates to processor 120A wirelessly via the internet. For example, a user of network device 110 establishing a connection with processor 120A via the network 180. In an example embodiment, the network device 110, the PCI device 120, and input device 150 may all communicate wirelessly via the Internet. In an example embodiment, the network device 110, the PCI device 120, and input device 150 may all communicate via a wired connection.

The network device 110 (e.g., a network adapter or any other component that connects a computer to a computer network) and PCI device 120 may also include one or more processors (e.g., CUP 120B-C), memory devices (e.g., memory device 130A-D), and input/output devices (e.g., I/O 140A-B).

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120B-C and a memory device 130A-D may be provided by one or more local buses of suitable architecture, for example, peripheral component interconnect (PCI).

In an example, the computer system may implement containers or virtual machines. Additionally, processor 120A may be a virtual processor with virtual processor cores. The processor may also include virtual dynamic processor frequency selection modules, virtual branch predictor modules, virtual measurement modules, and/or virtual power modules.

Figure 2:
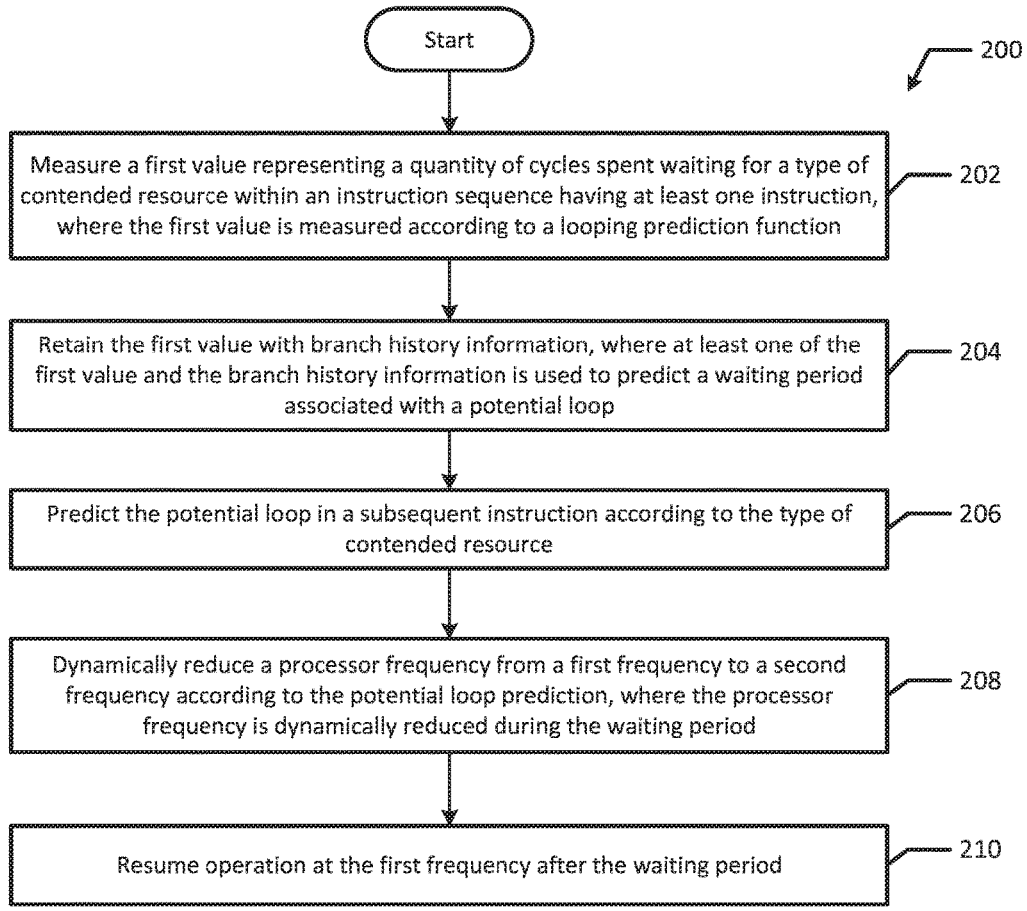
FIG. 2 illustrates a flowchart of an example process for dynamic processor frequency selection according to an example embodiment of the present disclosure.

FIG. 2 illustrates a flowchart of an example method 200 for dynamic processor frequency selection in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes measuring a first value representing a quantity of cycles spent waiting for a type of contended resource within an instruction sequence having at least one instruction, where the first value is measured according to a looping prediction function (block 202). For example, a measurement module 126 may measure a first value (e.g., 20,500 processor clock cycles) representing a quantity of cycles spent waiting for a type of contended resource within an instruction sequence. In an example, the instruction sequence may be processed out-of-order. For example, the processor 120A may execute instructions in an order governed by the availability of input data. In an example, the type of contended resource may be a data item, a lock, or an external event. For example, an external event may be a keystroke on keyboard 170 or a selection and/or click on mouse 160. The looping prediction function may measure processor clock cycles spent waiting for a contended resource, such as a database table. The looping prediction function may also calculate waiting periods based on clock cycles and branch history information. For example, the looping prediction function may account for processor frequency, clock cycles, and subsequent processing times spent on tasks that are often associated with the current waiting time (e.g., spin loop while waiting for password entry to compare against password in database table).

Then, the processor may retain the first value with branch history information, where at least one of the first value and the branch history information is used to predict a waiting period associated with a potential loop (block 204). For example, the processor 120A may retain a value of 20,500 processor clock cycles with branch history information (e.g., each time the database table is obtained, the passwords stored in the database table are decoded and compared to a password entered by the user), which may include information about the likelihood a conditional loop or a certain branch chain is taken. For example, since the passwords stored in the database table or often decoded and compared to a user entry when the database table is retrieved, the processor may speculatively decode password entries in the database table before the user enters a password. In an example, the processor 120A may save both the first value and the branch history information in memory 190. The processor 120A may use the first value to predict a waiting period associating with a potential loop. In another example, the processor 120A may use the branch history information to predict the waiting period. Additionally, the processor 120A may use the first value in conjunction with the branch history information to predict the waiting period (e.g., waiting period associated with retrieving the database table and spinlock while checking for a user password entry).

In an example, the processor 120A may insert a new operation into the instruction sequence during the waiting period. For example, the processor 120A may specifically modify code to instruct the processor to wait for a specific amount of time, such as the predicted waiting period. For example, by modifying instruction code to include a wait instruction, the processor 120A may wait for the contended resource without being restricted to cycling in a spin loop and just wasting resources. Rather, a new operation may be executable during an execution period, which may be substantially equal to the waiting period or may be shorter than the waiting period. For example, the processor 120A may advantageously execute new operations during the waiting period to optimize performance and reduce processor 120A down time. If the waiting period is 0.3 milliseconds, the processor 120A may execute new operations that take approximately 0.3 milliseconds to fully utilize what would otherwise be processor 120A downtime, thereby reducing the total time it takes the processor 120A to complete a batch of operations and instructions.

Then, the processor may predict the potential loop in a subsequent instruction according to the type of contended resource (block 206). For example, the processor 120A may predict the potential loop in a subsequent instruction according to the type of contended resource (e.g., database table) associated with the subsequent instruction. The subsequent instruction may be an instruction in the first instruction sequence or may be an instruction in a different instruction sequence received by the processor 120A. In an example, a dynamic frequency selection module 122 may predict the potential loop. For example, the dynamic processor frequency selection module 120 may predict the potential loop when it encounters the same type of contended resource. The processor may dynamically reduce a processor frequency from a first frequency state to a second frequency state according to the potential loop prediction, where the processor frequency is dynamically reduced during the waiting period (block 208). For example, during runtime, the processor 120A may dynamically reduce the processor frequency from a being set to a first frequency to a second frequency according to the potential loop prediction to reduce power consumption and conserve battery life. In an example, a power module 128 may dynamically reduce the processor 120A frequency. For example, the power module 128 may reduce the processor frequency from 4.2 GHz to 1.8 GHz to conserve system resources during the waiting period, which may advantageously improve efficiency and extend battery life and lifetime of computer components. In an example, the processor 120A may advantageously conserve resources by dynamically reducing processor voltage. For example, the processor 120A voltage may be reduced from a first voltage state (e.g., 2.8V) to a second voltage state (e.g., 2.0V) according to the potential loop prediction. In an example, the frequency reduction and voltage reduction may both occur simultaneously. For example, as the frequency is reduced from 4.2 GHz to 1.8 GHz, the voltage may be simultaneously reduced from 2.8V to 2.0V.

Then, the processor may resume operation at the first frequency state after the waiting period (block 210). For example, the processor 120A may resume operation at the first frequency setting (e.g., 4.2 GHz) after the waiting period. In an example, the processor 120A may resume operation at the first frequency setting (e.g., 4.2 GHz) before the potential loop is predicted to end to compensate for loops that end prior to calculated waiting times, which advantageously ensures that the processor 120A is not running at a lower performance for longer than necessary. In another example, the processor 120A may periodically check if the potential loop has ended during the waiting period to prevent the processor from running at a reduced performance state when the contended resource is available much earlier than expected.

Figure 3A:
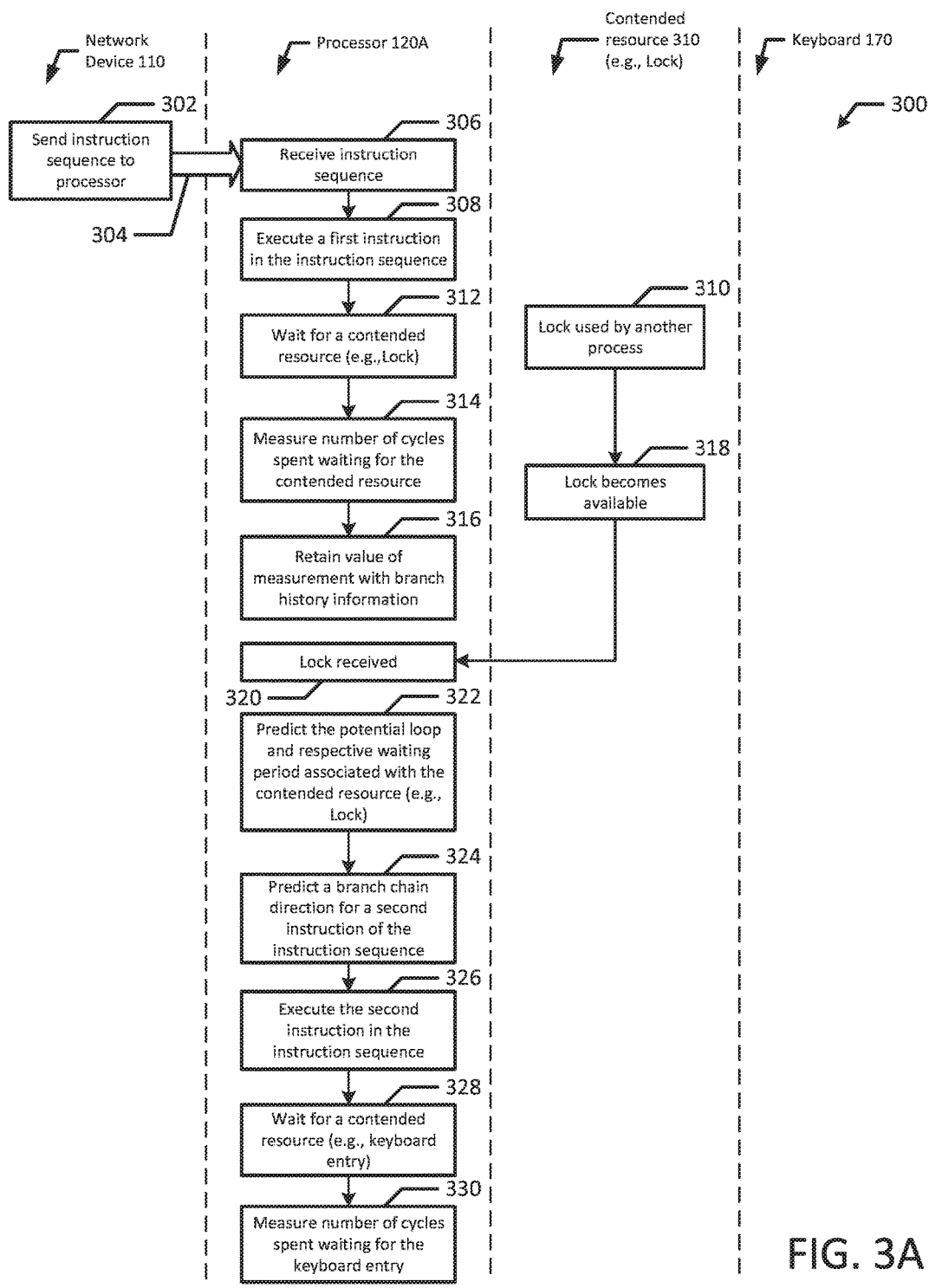
FIGS. 3A and 3B illustrate a flow diagram of an example process for dynamic processor frequency selection according to an example embodiment of the present disclosure.
Figure 3B:
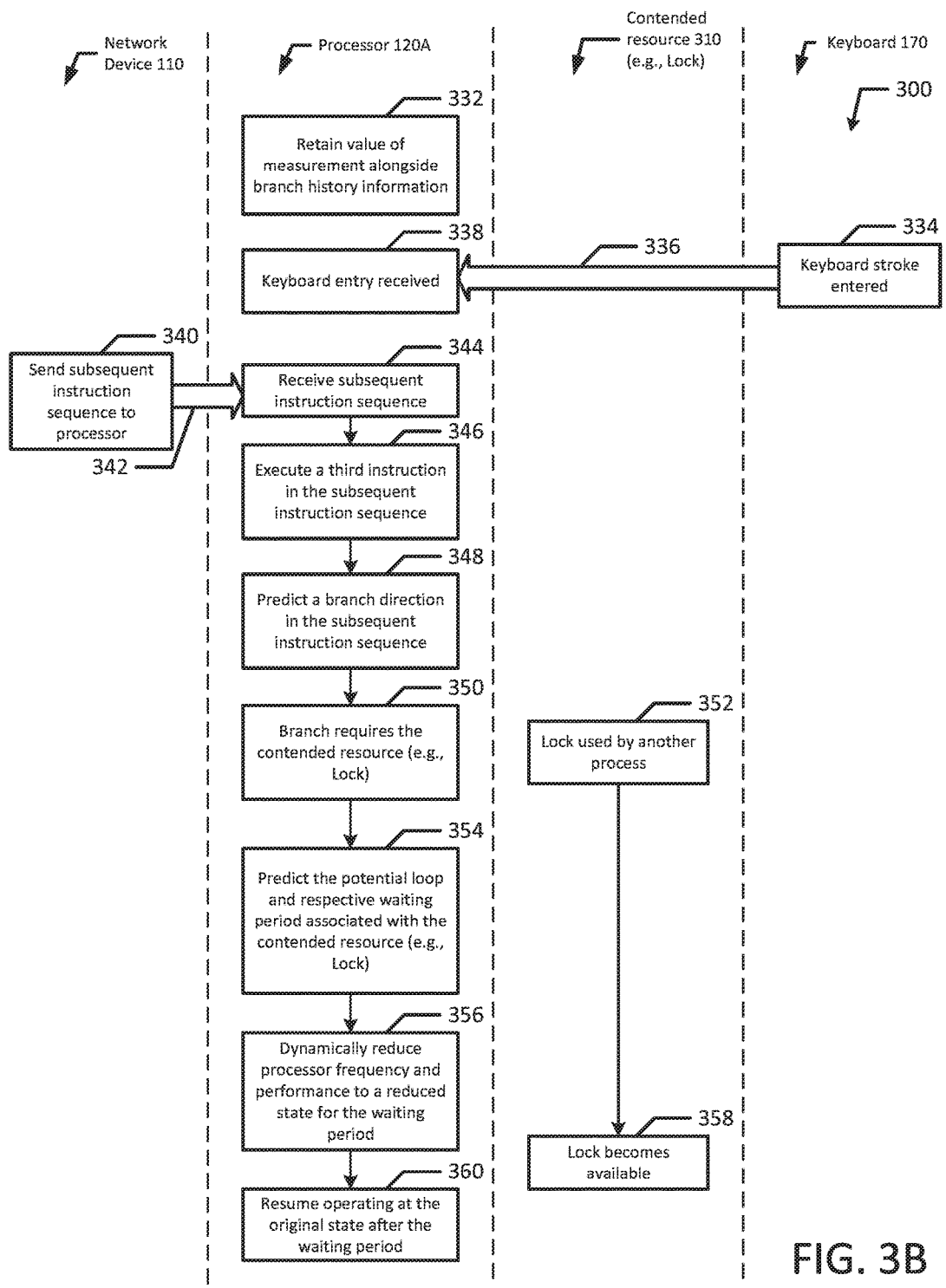

FIGS. 3A and 3B illustrate a flowchart of an example method 300 for dynamic processor frequency selection in accordance with an example embodiment of the present disclosure. Although the example method 300 is described with reference to the flowchart illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. For example, a network device 110, a processor 120A, and a peripheral device, such as a keyboard 170 may communicate and obtain contended resources 310 to perform example method 300.

In the illustrated example, the network device 110 may send an instruction sequence to the processor 120A (blocks 302 and 304). For example, the network device 110, such as a router, sends an instruction sequence to processor 120A. In an example, the network device 110 may send an instruction sequence to forward data packets (e.g., user profile information stored in a database table) to an input device 150 via network 180. Then, the processor 120A may receive the instruction sequence (block 306). For example, the processor 120A receives the instruction sequence and schedules the execution of the instruction sequence based on priority or availability of system resources. The processor 120A may execute a first instruction in the instruction sequence (block 308). For example, the processor 120A executes a first instruction in the instruction sequence in an out-of-order sequence or in sequential order. In an example, the instruction may require a resource, such as a data item (e.g., database table) or a lock (e.g., lock that protects the database table). Additionally, the resource may be a contended resource that is unavailable or has a conflict over access to the resource. For example, the resource may be a shared resource such as random access memory, disk storage, cache memory 194, etc. The contended resource (e.g., database table or lock protecting the database table) may be used by another process (block 310). For example, the lock limits access to a resource by preventing the processor 120A from accessing the corresponding data before acquiring the lock. For example, the database table may include data that is periodically updated and modified by other processes. The lock may ensure that only one process (e.g., process currently holding the lock) is accessing the database table at a time to prevent the processor 120A from obtaining information from the database before it is updated or from accessing the database while it is being modified, thereby resulting in a dirty read. Then, the processor 120A may wait for the contended resource (block 312). For example, a different processing thread may be utilizing the lock and the processor 120A waits for the lock to become available. Additionally, the processor 120A may measure a value of the number of cycles spent waiting for the contended resource (block 314). For example, the processor 120A may measure the value as 20,500 processor clock cycles spent waiting for the lock. The processor may also retain the value of the measurement with branch history information (block 316). In an example, the processor 120A stores the value of 20,500 processor clock cycles in a data structure with corresponding branch history information, which indicates that after the database table is acquired, the processor often times decodes passwords associated with the database table, in memory 190.

Then, the lock may become available (block 318). For example, the lock is made available only after it is released by the other processing thread. Additionally, if the lock is a spinlock, the lock may become available once the resource is available. Then, the processor 120A may receive the lock (block 320). For example, after the lock is released from one processing thread, the processor 120A acquires the lock and access the corresponding data, such as the database table. After receiving the lock, the processor 120A may execute other instructions in the instruction sequence. Additionally, the processor 120A may execute instructions from a different instruction sequence. Then, the processor 120A may predict the potential loop and respective waiting period associated with the contended resource (block 322). For example, while executing a subsequent instruction, the processor may encounter the same type of contended resource (e.g., database table or lock protecting the database table) and may predict the potential loop and respective waiting period for that contended resource based on the previously measured waiting periods for the same type of resource. In an example, the dynamic processor frequency selection module 122 may utilize several previous measurements to predict the potential loop and respective waiting period. For example, the processor 120A may have previously measured 15,000 clock cycles, 16,800 clock cycles, and 17,100 clock cycles at various processor frequencies waiting for the lock protecting the database table, and the dynamic processor frequency module 120 may utilize the previously recorded measurements, and respective frequency states, to predict the potential loop and a respective waiting period of 22 ms based on the processors current operating frequency.

Additionally, the processor 120A may predict a branch chain direction for a second instruction of the instruction sequence (block 324). For example, the processor 120A predicts that a branch will go a certain way based on branch history information, which may advantageously improve the flow of the instruction pipeline. The branch history information may suggest that when a database table is retrieved, password information included in the database table is decoded. Instead of waiting for each condition to be calculated to determine which conditional instruction should be executed, the processor 120A may advantageously avoid wasted time and may predict whether a conditional instruction will be taken or not. The branch that is predicted may then be fetched and speculatively executed, which advantageously improves processor 120A performance. In an example, multiple possible branches may be speculatively executed while waiting to see which branch is correct. In an instance when the prediction is wrong, the speculatively executed or partially executed instructions may be discarded and the processor 120A may start over with the correct branch. By utilizing branch history information, the processor branch predictor module 124 may advantageously improve branch predictions thereby increasing processor 120A efficiency and performance.

Then, the processor 120A may execute the second instruction in the instruction sequence (block 326). For example, the processor 120A executes the second instruction while predicting branch chain directions using branch history information. During the instruction sequence, the processor 120A may have to wait for a contended resource (e.g., a keyboard entry) (block 328). For example, an instruction may require a contended resource, such as an external event (e.g., a keyboard entry of a password or mouse click of a confirmation button) before execution of the instruction can be completed. Then, the processor 120A may measure a value of the number of cycles spent waiting for the keyboard entry (block 330). For example, the processor 120A measures the value of the number of clock cycles spent waiting for the external event (e.g., keyboard entry of "password_1") at a current frequency state. In an example, the measured value(s) may be saved in memory 190 for future reference. For example, when the processor 120A encounters an instruction requiring the same type of external event, a measured value may be used to predict a waiting period associated with the external event. The processor may retain the value of the measurement with branch history information (block 332). In an example, the processor 120A stores the value of 10,200 processor clock cycles in a data structure in memory 190. Additionally, the processor 120A may store branch history information corresponding to speculatively executed braches associated with the "password_1" entry in memory 190. In another example, the processor 120A may utilize both the value of the measurement and the branch history information to store specific information about the instruction sequence execution.

Then, a peripheral device, such as a keyboard 170 may register a keyboard stroke (blocks 334 and 336). For example, a user enters "password_1" keystrokes for their password, which may be required by the instruction sequence. The processor 120A may receive the keyboard entry (block 338). For example, once the external event (e.g., "password_1" keystrokes) occurs, the processor 120A receives the "password_1" keyboard entry and proceed with executing instructions to provide information (e.g., user profile information, such as current account balance) from the database table to the user.

The network device 110 may send a subsequent instruction sequence to the processor 120A (blocks 340 and 342). For example, the network device 110, such as a router, sends a subsequent instruction to processor 120A to forward data packets to a PCI device 120 via network 180. The processor 120A may receive the subsequent instruction sequence (block 344). For example, the processor 120A receives the subsequent instruction sequence to forward data packets associated with user profile information stored in a database table and schedules the subsequent instruction sequence accordingly. Then, the processor 120A may execute a third instruction in the subsequent instruction sequence (block 346). For example, if the processor 120A executes the subsequent instruction sequence out-of-order, the processor 120A executes a third instruction once the appropriate input data becomes available. In an example, the processor 120A may utilize out-of-order executing rather than executing instructions by their original order in the instruction sequence to avoid being idle while waiting for the preceding instruction to complete in order to retrieve data for the next instruction in the instruction sequence.

The processor 120A may predict a branch direction in the subsequent instruction sequence (block 348). For example, the branch prediction module 124 predicts, based on branch history information from previous instruction sequences, that the instruction sequence usually executes a database call to disk memory for password information and proceeds with executing the appropriate speculative instructions based on the predicted branch directions. In another example, the prediction may be based on branch history information retained for a specific instruction sequence. For example, the branch history information may be instruction sequence dependent. In another example, the processor 120A may store branch history information for a predetermined time period (e.g., 45 minutes, 3 hours, 5 days). In another example, the processor 120A may store branch history information for a predetermined quantity of instructions. Then, the processor 120A may determine that a specific branch requires the contended resource 310, such as a database table protected by a lock (block 350). For example, the processor 120A determines that the contended resource 310 is the same type of contended resource 310 (e.g., database table protected by a lock) encountered in a previous instruction sequence or during execution of a previous instruction in the same instruction sequence. The lock may be held and used by another process (block 352). For example, while a different processing thread holds the lock and updates information in the database table, the processor 120A waits for the lock to be released and to become available.

The processor 120A may predict the potential loop and the respective waiting period associated with the contended resource, such as the database table protected by the lock (block 354). Additionally, the processor 120A may measure the value of the number of clock cycles spent waiting for the lock to improve future predictions. For example, if the measurement module 126 measured a value of 20,500 cycles the first time the lock was encountered, the predicted potential loop and respective waiting period may be calculated using a looping prediction function that uses 20,500 cycles as an input. The measurement module may measure a value of 21,000 cycles the second time the lock is encountered and the predicted potential loop and respective waiting period may be based on both the 20,500 cycle measurement and the 21,000 cycle measurement. Then, the processor 120A may dynamically reduce the processor frequency to a reduced state for the waiting period (block 356). For example, based on the measured values and/or branch history information, the dynamic processor frequency selection module 122 predicts a waiting period of 25 ms and instructs the power module 128 to dynamically reduce the processor 120A frequency to a reduced state (e.g., 1.8 GHz) for the duration of the waiting period (e.g., 25 ms) during runtime. Next, the lock may become available (block 358). For example, the lock may be released by a different processing thread and the processor 120A may acquire the lock to access the database table. The processor 120A may resume operating at the original state after the waiting period (block 360). For example, the dynamic processor frequency selection module 122 may track the waiting time based on an internal processor time keeper, such as a clock, and send an instruction to power module 128 to throttle up the processor frequency once the waiting period ends. Additionally, the dynamic processor frequency selection module 122 may track processor clock cycles and processor frequency to determine the time spent waiting. In an example, the processor 120 resumes operating at the original state (e.g., 4.2 GHz) before the lock becomes available. For example, the waiting period may be calculated to account for a shorter waiting time to reduce the likelihood of the processor 120A running at a reduced performance level (e.g., lower frequency and/or voltage) while the lock or other contended resource becomes available.

Figure 4:
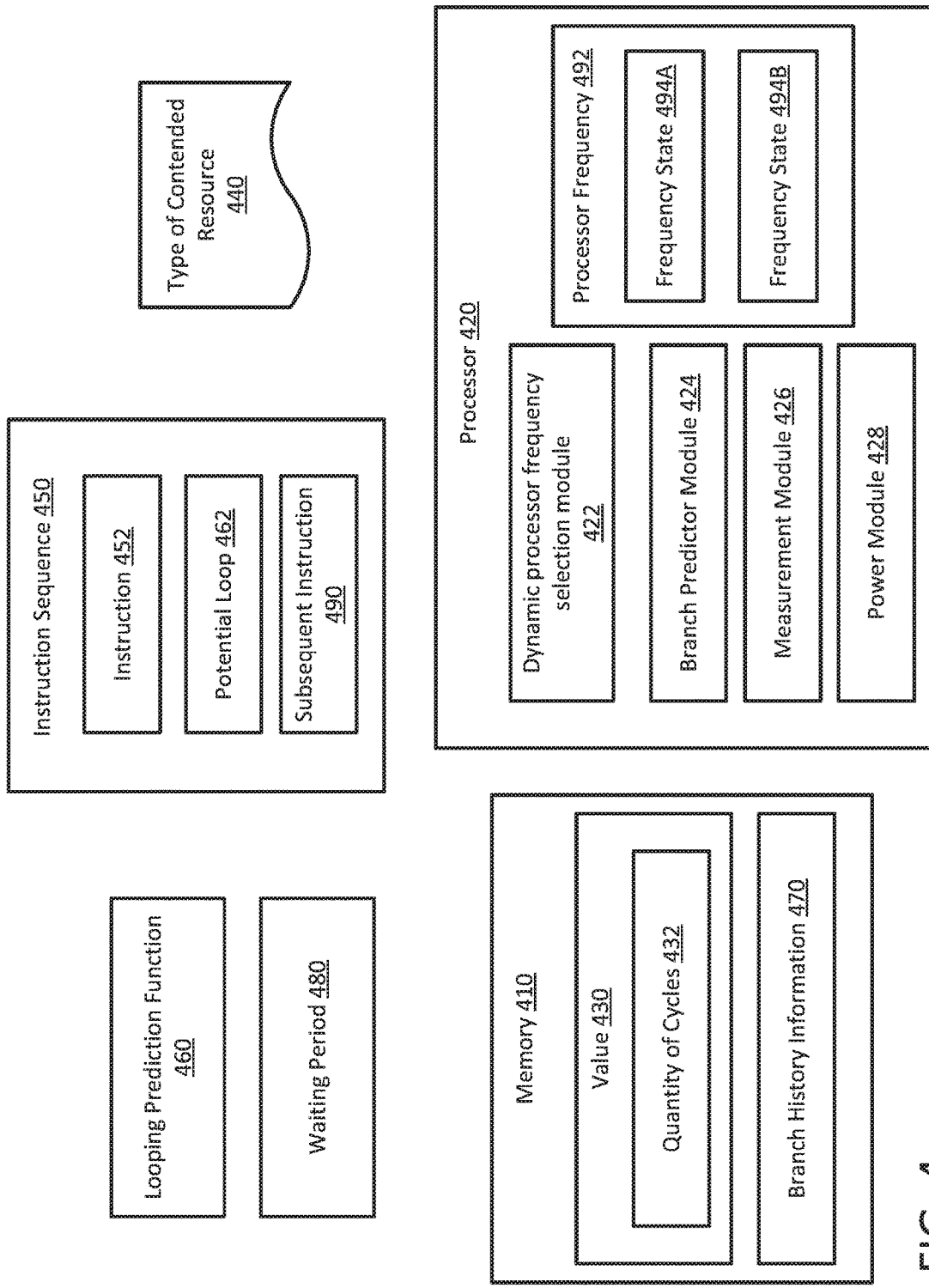
FIG. 4 illustrates a block diagram of an example dynamic processor frequency selection system according to an example embodiment of the present disclosure.

FIG. 4 is a block diagram of an example dynamic processor frequency selection system 400 according to an example embodiment of the present disclosure. The dynamic processor frequency selection system 400 may include a memory 410 and a processor 420 in communication with the memory 410. The processor 420 may include a dynamic processor frequency selection module 422, a branch predictor module 424, a measurement module 426, and a power module 428. The measurement module 426 may measure a first value 430 representing a quantity of cycles 432 spent waiting for a type of contended resource 440 within an instruction sequence 450. The instruction sequence 450 may have an instruction 452. The first value 430 may be measured according to a looping prediction function 460. Additionally, the processor 420 may retain the first value 430 with branch history information 470. The first value 430, the branch history information 470, or a combination of the first value 430 and branch history information 470 may be used to predict a waiting period 480 associated with a potential loop 462. Then, the dynamic processor frequency selection module 422 may predict the potential loop 462 in a subsequent instruction 490 according to the type of contended resource 440. The power module 428 may dynamically reduce a processor frequency 492 from a first frequency state 494A to a second frequency state 494B according to the potential loop 462 prediction, which dynamically reduces the processor frequency 492 during the waiting period 480. Then, the processor 420 may resume operation at the first frequency state 494A after the waiting period 480.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory; and
at least one processor in communication with the memory, the at least one processor including a dynamic processor frequency selection module, a branch predictor module, a measurement module, and a power module, wherein the processor is caused to:
measure, by the measurement module, a first value representing a quantity of cycles spent waiting for a type of contended resource within an instruction sequence having at least a first instruction, wherein the first value is measured according to a looping prediction function,
retain the first value with branch history information, wherein at least one of the first value and the branch history information is used to predict a waiting period associated with a potential loop,
predict, by the dynamic processor frequency selection module, the potential loop in a subsequent second instruction, which is encountered after the first instruction, according to the type of contended resource,
dynamically reduce a processor frequency, by the power module, from a first frequency state to a second frequency state according to the potential loop prediction, wherein the power module dynamically reduces the processor frequency during the waiting period, and resume operation at the first frequency state after the waiting period.

2. The system of claim 1, wherein the contended resource includes at least one of a data item, a lock, and an external event.

3. The system of claim 2, wherein the lock is a spinlock.

4. The system of claim 1, wherein the instruction sequence is processed out-of-order.

5. The system of claim 1, wherein a processor voltage is reduced from a first voltage state to a second voltage state according to the potential loop predication, wherein the power module dynamically reduces the processor voltage during the waiting period.

6. A method comprising:
measuring a first value representing the number of cycles spent waiting for a type of contended resource within an instruction sequence having at least a first instruction, wherein the first value is measured according to a looping prediction function;
retaining the first value alongside branch history information, wherein at least one of the first value and the branch history information is used to predict a waiting period associated with a potential loop;
predicting the potential loop in a subsequent second instruction, which is encountered after the first instruction, according to the type of contended resource;
dynamically reducing a processor frequency from a first frequency state to a second frequency state according to the potential loop prediction, wherein the processor frequency is dynamically reduced during the waiting period; and
resuming operation at the first frequency state after the waiting period.

7. The method of claim 6, further comprising inserting a new operation into the instruction sequence, wherein the new operation is executable during an execution period, the execution period being substantially equal to the waiting period.

8. The method of claim 6, further comprising inserting a new operation into the instruction sequence, wherein the new operation is executable during an execution period, the execution period being shorter than the waiting period.

9. The method of claim 6, further comprising:
measuring a second value representing a second quantity of cycles spent waiting for the contended resource, wherein the second value is measured according to the looping prediction function;
retaining the second value with branch history information, wherein the first value, second value, and the branch history information are used to predict a second waiting period.

10. The method of claim 6, wherein the instruction sequence is processed out-of-order.

11. The method of claim 6, wherein a processor voltage is reduced from a first voltage state to a second voltage state according to the potential loop prediction, wherein the processor voltage is dynamically reduced during the waiting period.

12. The method of claim 6, further comprising predicting a branch direction in a subsequent instruction sequence according to the branch history information.

13. The method of claim 6, wherein the contended resource includes at least one of a data item, a lock, and an external event.

14. The method of claim 13, wherein the lock is a spinlock.

15. A non-transitory machine readable medium storing code, which when executed by a processor, causes the processor to:
measure a first value representing a quantity of cycles spent waiting for a type of contended resource within an instruction sequence having at least a first instruction, wherein the first value is measured according to a looping prediction function;
retain the first value with branch history information, wherein at least one of the first value and the branch history information is used to predict a waiting period associated with a potential loop;
predict the potential loop in a subsequent second instruction, which is encountered after the first instruction, according to the type of contended resource;
dynamically reduce a processor frequency from a first frequency state to a second frequency state according to the potential loop prediction, wherein the processor frequency is dynamically reduced during the waiting period; and
resume operation at the first frequency state after the waiting period.

16. The non-transitory machine readable medium of claim 15, which further causes the processor to insert a new operation into the instruction sequence, wherein the new operation is executable during an execution period, the execution period being substantially equal to the waiting period.

17. The non-transitory machine readable of claim 15, which further causes the processor to insert a new operation into the instruction sequence, wherein the new operation is executable during an execution period, the execution period being shorter than the waiting period.

18. The non-transitory machine readable of claim 15, which further causes the processor to:
measure a second value representing a second quantity of cycles spent waiting for the contended resource, wherein the second value is measured according to the looping prediction function; and
retain the second value with branch history information; wherein the first value, second value, and the branch history information are used to predict a second waiting period.

19. The non-transitory machine readable of claim 15, wherein the first instruction sequence is processed out-of-order.

20. The non-transitory machine readable of claim 15, wherein a processor voltage is reduced from a first voltage state to a second voltage state according to the potential loop prediction, wherein the processor voltage is dynamically reduced during the waiting period.

* * * * *